US012632679B2

(12) United States Patent
Meindl et al.

(10) Patent No.:  US 12,632,679 B2
(45) Date of Patent:       May 19, 2026

(54) PROXIMITY CHECK FOR COMMUNICATION DEVICES

(71) Applicant: NXP B.V., Eindhoven (NL)

(72) Inventors: Reinhard Meindl, Graz (AT); Peter Thüringer, Graz (AT)

(73) Assignee: NXP B.V., Eindhoven (NL)

( * ) Notice:  Subject to any disclaimer, the term of this patent is extended or adjusted under 35 U.S.C. 154(b) by 0 days.

(21) Appl. No.: 18/784,988

(22) Filed: Jul. 26, 2024

(65) Prior Publication Data

US 2025/0068863 A1      Feb. 27, 2025

(30) Foreign Application Priority Data

Aug. 25, 2023    (EP) ..................................... 23193392

(51) Int. Cl.
| *G06K 7/10* | (2006.01) |
| *H04L 9/40* | (2022.01) |
| *H04W 12/08* | (2021.01) |
| *H04W 12/122* | (2021.01) |

(52) U.S. Cl.
CPC ........ *G06K 7/10128* (2013.01); *H04L 63/107* (2013.01); *H04W 12/08* (2013.01); *H04W 12/122* (2021.01)

(58) Field of Classification Search
CPC ............ G06K 7/10128; G06K 19/0723; H04L 63/107; H04W 12/122; H04W 12/63; H04B 17/309
See application file for complete search history.

(56) References Cited

U.S. PATENT DOCUMENTS

| 9,298,955 | B2 | 3/2016 | van Roermund et al. |
| 9,805,228 | B2 | 10/2017 | Janssens |
| 2016/0200291 | A1 | 7/2016 | Kim et al. |
| 2019/0318303 | A1* | 10/2019 | Smith .................. G06Q 10/087 |

FOREIGN PATENT DOCUMENTS

| EP | 2940882 | B1 | 11/2017 |
| KR | 101141830 | B1 | 5/2012 |
| WO | 2009/144534 | A1 | 12/2009 |

* cited by examiner

*Primary Examiner* — Vernal U Brown

(57) ABSTRACT

The disclosure relates to performing a proximity check to determine whether a transponder device is in proximity of a reader device. In an example embodiment, a method of performing a proximity check to determine whether a transponder device is in proximity of a reader device comprises: transmitting a command from the reader device to the transponder device, the command including a request for a measured response time for a number n of previous command-response exchanges stored by the transponder device; in response to receiving the command at the transponder device, transmitting a response to the reader device, the response including a measured response time stored by the transponder device for the previous n command-response exchanges; and determining whether a predetermined criterion for the proximity check is fulfilled by comparing a measured response time stored by the reader device with the measured response time transmitted by the transponder device in the response.

18 Claims, 3 Drawing Sheets

PROXIMITY CHECK FOR COMMUNICATION DEVICES

CROSS-REFERENCE TO RELATED APPLICATION

This application claims priority under 35 U.S.C. § 119 to European patent application no. 23193392.0, filed 25 Aug. 2023, the contents of which are incorporated by reference herein.

TECHNICAL FIELD

The disclosure relates to performing a proximity check to determine whether a transponder device is in proximity of a reader device. The disclosure further relates to a reader device, a transponder device and a contactless communication system comprising such devices.

BACKGROUND

Contactless interfaces, as for example standardized in ISO/IEC 14443, are used for a number of security applications including contactless payment cards, vehicle or building access and for verification of documents such as biometric passports and identity cards. Such contactless interfaces are vulnerable to relay attacks, in which an unauthorised third party relays information between a transponder device (or PICC, proximity integrated circuit card) and a reader device (or PCD, proximity coupling device) when the transponder device is not in close proximity to the reader device.

An example of a relay attack is when a contactless payment card is read without the knowledge of its owner and information from the card is relayed by a fraudulent card reader to another device that is in close proximity to a valid reader device. Only if the transponder and reader devices are in actual physical close proximity should a transaction be allowed. Any situation where a fraudulent relay attempts to interpose between the transponder and reader devices needs to be detected. This may be done using a proximity check, in which a series of command-response exchanges is carried out between a reader device and a transponder device to determine whether the transponder device is in actual physical proximity. An example of a proximity check is described in EP2940882B1, in which an expected transponder device response time is used to determine whether a transponder device fulfils a predetermined criterion.

The risk of relay attacks can be mitigated by controlling the exact elapsed time between messages exchanged from PCD to PICC, which can be defined as the time starting at the end of the last bit transmitted by the PCD and ending with the first bit of the response transmitted by the PICC. For simplicity this time may be called the frame delay time (FDT). Although the term is generally used for Type A cards under the ISO/IEC 14443 standard, the same principle applies to both types A and B cards.

Some existing methods of reducing the risk of relay attacks allow for only a very short time window, which aims to reduce the chances of establishing a relay attack. However, such an approach imposes strong demands on the PICC reaction time, which may be undesirable from application perspective. Also, the acceptable time may become reduced over time when more sophisticated relays become available.

SUMMARY

According to a first aspect there is provided a method of performing a proximity check to determine whether a transponder device is in proximity of a reader device, the method comprising:

transmitting a command from the reader device to the transponder device, the command including a request for a measured response time for a number n of previous command-response exchanges stored by the transponder device;

in response to receiving the command at the transponder device, transmitting a response to the reader device, the response including a measured response time stored by the transponder device for the previous n command-response exchanges; and determining whether a predetermined criterion for the proximity check is fulfilled by comparing a measured response time stored by the reader device with the measured response time transmitted by the transponder device in the response.

The method provides a way of preventing relay attacks that is flexible for different FDTs by the PICC (transponder device) and PCD (reader device) both measuring and exchanging the actual FDT for specific command-response exchanges, which can then be checked to determine whether the transponder device is genuine.

Since any relay attack would add additional time to the FDT, such an attack can be detected and a fraudulent transaction can then be aborted. The allowed tolerance for such an acceptable time window does not need to be fixed but can be a parameter in the protocol and provided by either the PCD or PICC. A device may take into account its own tolerances when reporting or storing a measured FDT so managing or fixing of tolerances is not required.

The number n may be greater than 1 and may be no greater than 8.

The step of determining whether a predetermined criterion for the proximity check is fulfilled may be performed by the reader device.

The reader device may abort further command-response exchanges with the transponder device if the predetermined criterion for the proximity check is not fulfilled. The predetermined criterion may comprise the measured response time stored by the reader device being equal to the measured response time transmitted by the transponder device in the response.

The method may comprise, prior to the step of transmitting the command from the reader device to the transponder device:

the reader device transmitting a previous command to the transponder device;

the transponder device transmitting a previous response to the reader device in response to the previous command; and the transponder device storing a measured response time for the previous response in a transponder memory.

The previous command may comprise a random number generated by the reader device. The previous command may be repeated n times prior to the step of transmitting the command from the reader device to the transponder device.

According to a second aspect there is provided a reader device configured for contactless communication with a transponder device, the reader device comprising:

an antenna;

a memory; and a processing unit, wherein the processing unit is configured to:

transmit a command from the reader device to the transponder device, the command including a request for a measured response time for a number n of previous command-response exchanges stored by the transponder device;

in response to the command, receiving from the transponder device, a response including a measured response time stored by the transponder device for the previous n command-response exchanges; and determine whether a predetermined criterion for the proximity check is fulfilled by comparing a measured response time stored by the reader device with the measured response time transmitted by the transponder device in the response.

The number n may be greater than 1 and may be no greater than 8.

The reader device may be configured to abort further command-response exchanges with the transponder device if the predetermined criterion for the proximity check is not fulfilled.

The predetermined criterion may comprise the measured response time stored by the reader device being equal to the measured response time transmitted by the transponder device in the response.

According to a third aspect there is provided a transponder device configured for contactless communication with a reader device, the transponder device comprising:

an antenna;

a memory; and a processing unit, wherein the processing unit is adapted to:

measure and store in the memory a response time during a command-response exchange with the reader device;

receive a command from the reader device, the command including a request for a measured response time for a number n of previous command-response exchanges stored in the memory; and in response to the command, sending a response including a stored measured response time for the previous n command-response exchanges.

The number n may be greater than 1 and may be no greater than 8.

According to a fourth aspect there is provided a communication system comprising:

a reader device according to the second aspect; and a transponder device according to the third aspect.

These and other aspects of the invention will be apparent from, and elucidated with reference to, the embodiments described hereinafter.

BRIEF DESCRIPTION OF THE DRAWINGS

Embodiments will be described, by way of example only, with reference to the drawings, in which.

Figure 1:
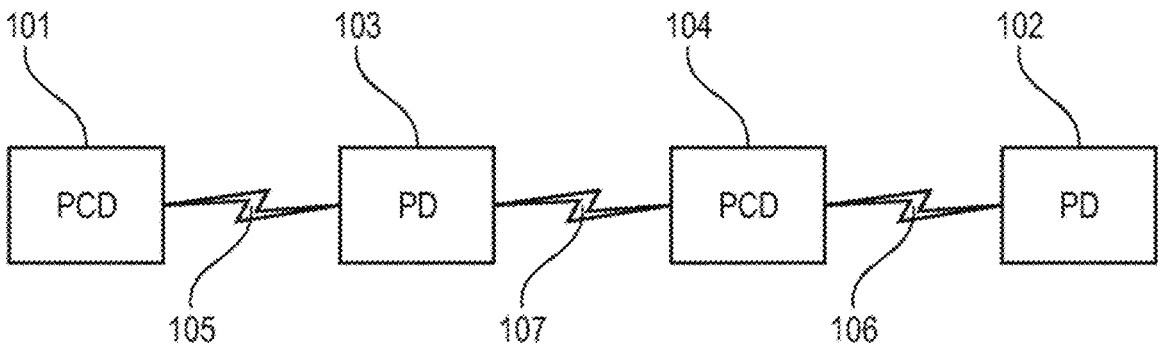
FIG. 1 is a schematic diagram illustrating the principal of a relay attack.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION

FIG. 1 shows a principal illustration of a relay attack. More specifically, FIG. 1 shows a legitimate reader device 101 and a legitimate transponder device 102 which are not in proximity of one another, i.e. they are not able to directly communicate via their respective contactless interfaces (not shown). The legitimate reader device 101 may e.g. be part of a cashier system at a store offering contactless payment. The legitimate transponder device 102 may e.g. be a NFC enabled mobile telephone in the pocket of a user at some other location, such as in a public transportation vehicle, café or other public place.

FIG. 1 further shows an attacking transponder device 103 and an attacking reader device 104. As shown, the attacking transponder device 103 is in proximity of the legitimate reader device 101 and thus capable of performing contactless communication with the latter as indicated by 105. Similarly, the attacking reader device 104 is in proximity of the legitimate transponder device 102, e.g. in a pocket of an attacker sitting next to the person carrying the legitimate transponder device 102, and thus capable of 25 performing contactless communication with the latter as indicated by 106. The attacking transponder device 103 and the attacking reader device 104 are in communication with each other via a high-bandwidth data connection, such as a mobile 3G, 4G or subsequent generation network.

Thereby, if proper measures are not taken, the attackers, i.e. those carrying the attacking devices 103 and 104, may for example be able to use a user account on the legitimate transponder device 102 to perform a payment transaction in the store where the legitimate reader device 101 is installed.

Figure 2:
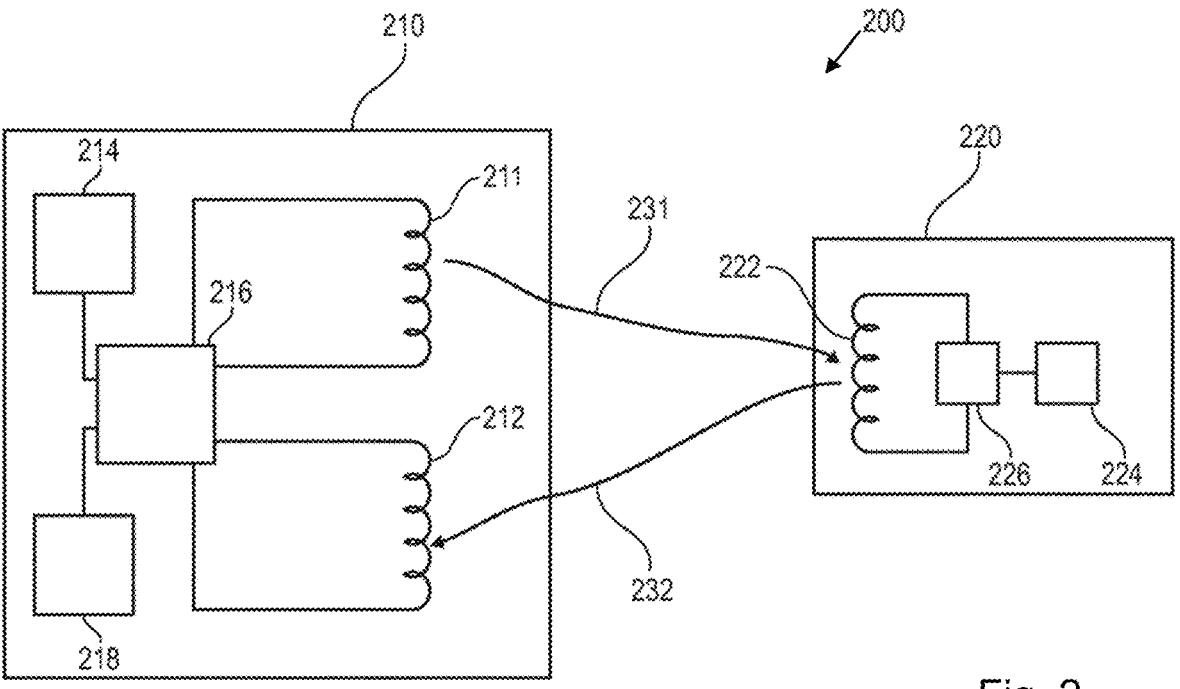
FIG. 2 is a schematic diagram illustrating an example contactless communication system.

FIG. 2 illustrates an example contactless communication system 200. The system 200 comprises a reader device 210 and a transponder device 220. The reader device 210 comprises a transmitter antenna 211 and a receiver antenna 212, both of which are communicatively coupled with a reader processing unit 216, such as a microprocessor or central processing unit. The transmitter antenna 211 is capable of wirelessly transmitting a communication message (or command) 231 to the transponder device 220. The receiver antenna 212 is capable of wirelessly receiving a communication message (or response) 232 from the transponder device 220. In alternative embodiments, the transmitter antenna 211 and receiver antenna 212 may be replaced by a single common shared transceiver antenna.

The antennas 211, 212 are electrically coupled with the processor 216 so that data may be sent from the processor 216 to the transmission antenna 211 for transmission as a communication message 231. A communication message 232 received by the receiver antenna 212 may also be analyzed and processed by the processor 216. A command 231 transmitted from the reader device 210 to the transponder device 220 and a subsequent response 232 transmitted from the transponder device 220 to the reader device 210 in response to the command 231 may be termed a command-response exchange. Such command-response exchanges form the basis for communication between the reader device 220 and the transponder device 220 as described herein.

A reader memory (or storage unit) 214, such as a semiconductor memory, is coupled with the processor 216 so as to allow the reader device 210 to store data accessible by the processor 216.

Furthermore, an input/output unit 218 is shown which allows a user to operate the reader device 210. The input/output unit 218 is an optional feature that may not necessarily be included in some implementations (e.g. in reader devices for building access control or public transportation systems) and may comprise input elements such as buttons, a keypad, a joystick or the like. Via such input elements, a user may input commands to the reader device 210. Furthermore, the input/output unit 218 may comprise a display unit such as a liquid crystal display allowing display results of the reading procedure of the reader device 210.

As further shown in FIG. 2, the transponder device 220 comprises a transmission and receiver antenna 222, a processor 226, such as a microprocessor, and a transponder memory 224. The transponder memory 224 and processor 226 may be monolithically integrated in an integrated circuit (IC) which can be connected to the antenna 222 and attached to a support, such as for example a piece of fabric or card.

Figures 3A, 3B:
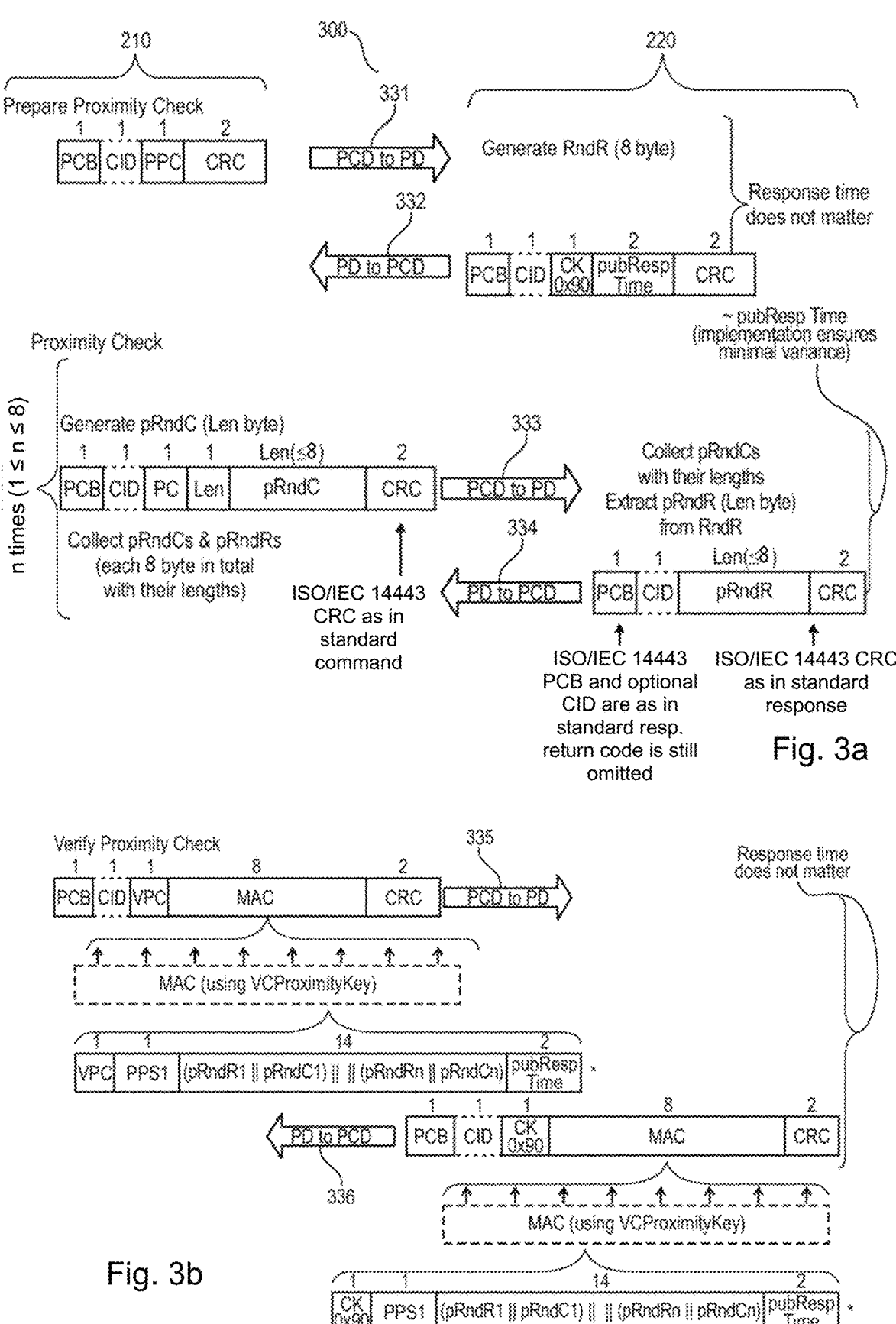
FIG. 3a is a schematic message flow diagram illustrating steps of preparing and performing initial steps of a proximity check.
FIG. 3b is a schematic message flow diagram illustrating a step of verifying a proximity check.

FIGS. 3a and 3b illustrate an example message flow between a reader device, such as the reader device 210 of FIG. 2, and a transponder device, such as the transponder device 220 of FIG. 2. First, as indicated by arrow 331, the reader device 210 transmits a first command (termed a Prepare Proximity Check, or PPC, command) to the transponder device 220. The transponder device 220 responds to the PPC command 331 by transmitting a (first) response 332 back to the reader device 210. The response 332 includes the expected response time pubRespTime stored in the memory 224 of the transponder device. Further, as shown in FIG. 3a, the first response 332 may include an OK and a CRC (Cyclic Redundancy Check).

Prior to, or while, transmitting the first response 332, the transponder device 220 generates a 7 byte random number RndR for responding to a random challenge to come from the reader device 210. The reader device 210 then generates a 8 byte random challenge RndC and transmits it, at least in part pRndC, together with a CRC to the transponder device 220 as a second command (termed a Proximity Check, or PC, command) as indicated by arrow 333. In other examples, random challenges with different lengths, such as 4, 6, 7, 10 or 12 bytes, or any other number of bytes, may be used.

Upon receiving the second command 333, the transponder device 220 processes the received (partial) random challenge and prepares a corresponding second response as is known in the art. The second response is transmitted to the reader device 210 as indicated by arrow 334 such that it will be received by the reader device 210 approximately pubRespTime (with minimum variance) after the transmission of the second command 333 by the reader device 210 was completed. Now, if the transponder device 220 is not actually in the proximity of reader device 210, this transmission will be delayed, i.e. the expected response time pubRespTime will be exceeded. The transmissions of the second command 333 and the corresponding second response 334 may be repeated until the complete random challenge RndC and the complete response thereto RndR have been transmitted.

As further illustrated in FIG. 3b, upon completion of the exchange of random challenge and response the processing unit 216 of the reader device 210 determines whether the actual response time matches the expected response time pubRespTime with at least a predetermined precision, e.g. it does not exceed pubRespTime by more than 10%. If this is not the case, communication with the transponder device 220 is terminated and a corresponding error message is output. If, on the other hand, the actual response time matches the expected response time pubRespTime with the required precision, the reader device 210 generates a reader MAC over the random challenges and responses and the expected response time pubRespTime received with the first response 332. The generated reader MAC and a CRC are transmitted from the reader device 210 to the transponder device 220 as a third command (Verify Proximity Check (VPC) command) as indicated by arrow 335. The transponder device 220 generates an expected reader MAC over the received third command 335 and compares it with the received reader MAC to authenticate the third command 335. Then, the transponder device 220 generates a transponder MAC over the random challenges and responses and the expected response time pubRespTime as stored in its memory 224. The transponder device 220 transmits the latter together with a CRC to the reader device 210 as a third response as indicated by arrow 336. Finally, the reader device 210 generates an expected transponder MAC over the received third response 336 and compares it with the received transponder MAC to authenticate the third response 336. If the processor 216 of the reader device 210 determines that the received third response 336 is authentic, the proximity check is deemed successful, i.e. a relay attack can be ruled out.

Figure 4:
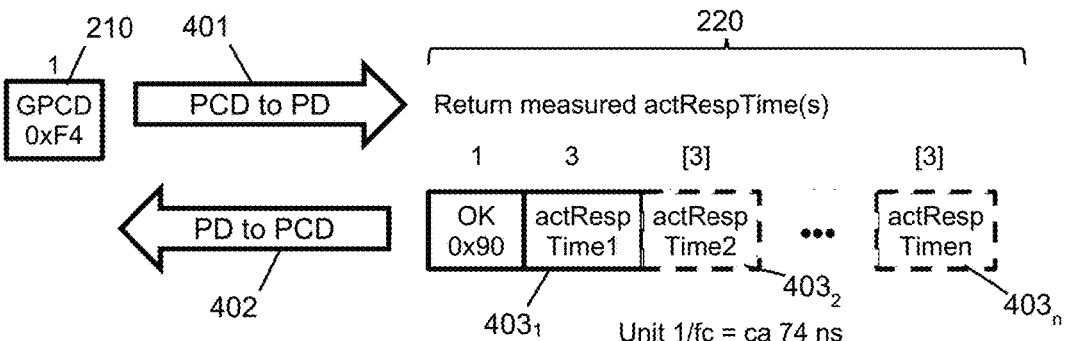
FIG. 4 is a schematic message flow diagram illustrating a step of performing a proximity check.

In addition to, or instead of, the above sequence of command-response exchanges in carrying out a proximity check, i.e. messages 333, 334, a command-response exchange as illustrated in FIG. 4 is performed between the reader device 210 and the transponder device 220. A command 401 is transmitted from the reader device 220 to the transponder device 220 that includes a request for a measured response time for a number n of previous command-response exchanges stored by the transponder device 220. This requires the transponder device 220 to be configured to respond to such a command, which can be determined during the command-response exchange illustrated in FIG. 3a and described above, in which the response 332 includes an indication or flag that the transponder device 220 is capable of supporting such a request. The proximity check carried out using the command 333 and response 334 can include the transponder device 220 storing a measured actual response time, for example in the transponder memory 224.

In response to the command 401, the transponder device 220 returns a response 402 that comprises a previously stored measured response time $403_{1-n}$. The measured response time $403_{1-n}$ may include stored response times for one or more previous command-response exchanges. The number n of response times requested by the reader device 210 and provided by the transponder device may for example be between 1 and 8 and may, for example, be determined by how many previous command-response exchanges have been initiated by the reader device 210 for the particular transponder device 220. Both the reader device 210 and transponder device 220 are configured to stored the measured response time for each command-response exchange. Therefore, the reader device 210 can determine whether the transponder device 220 is authentic by comparing the stored measured response times with response times received from the transponder device 220, thereby improving assurance that the response is from a genuine transponder device and not from a relay attack device.

The measured response times $403_{1-n}$ may be encoded in units according to the carrier frequency fc used in the response 402. The carrier frequency fc may in a particular example be around 13.5 MHZ, making the unit equal to around 74 ns. The measured response times stored in the transponder and reader devices 220, 210 are thereby stored in units of 74 ns.

In the command-response exchange for the process of verifying the proximity check, as illustrated in FIG. 3b above, the expected response times pubRespTime in the command 335 and response 336 are instead the actual response times (actRespTime1-n, shown in FIG. 4) stored in the reader device 210 and transponder device 220 for the previous n command-response exchanges. The Verify Proximity Check process may otherwise be similar. The expected response time pubRespTime may also be included in the response 336 from the transponder device 220. In a general aspect, the method may comprise transmitting a command 335 from the reader device 210 to the transponder device 220, the command 335 comprising a reader message authentication code (MAC) based at least on the measured response time stored by the reader device 210. In response to receiving the command 335, the transponder device 220 calculates an expected reader MAC based on the command, verifies that the expected reader MAC equals a reader MAC in the command, and transmits a response 336 to the reader device 210 that comprises a transponder MAC based at least on the measured response time stored by the transponder device. In response to receiving the response, the reader device calculates an expected transponder MAC based on the response and verifies that the expected transponder MAC equals the transponder MAC in the response. This verification step ensures that a relay device is not able to change the message from the transponder with false measured response times. Other verification methods that ensure measured response times are from a genuine transponder may alternatively be used.

The reader device 210 and the transponder device 220 may have a shared secret key such that data packages communicated between the devices can be encrypted and verified. Random numbers are used in the command-response exchanges to prevent transactions from being reused.

Figure 5:
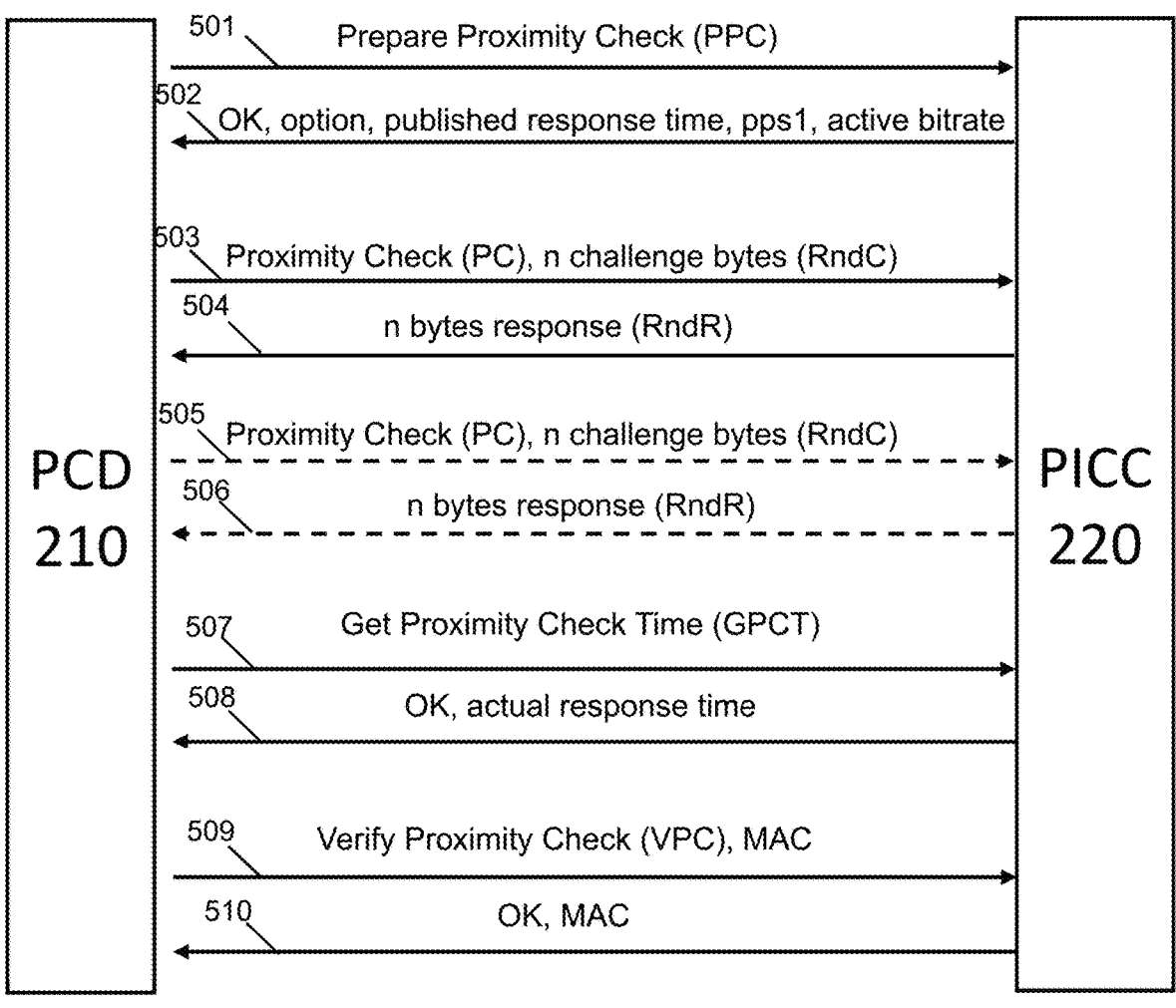
FIG. 5 is a schematic diagram illustrating an example sequence of command-response exchanges between a reader device and a transponder device.

FIG. 5 illustrates an example sequence of command-response exchanges 501-510 between a reader device (PCD) 210 and a transponder device (PICC) 220 that includes a command-response exchange comprising a request for a stored measured response time for a number of previous command-response exchanges. A first command 501 is a Prepare Proximity Check (PPC) command, which the transponder device 220 responds to by generating random numbers RndR and sending a first response 502 including a published response time pps1 as well as the communication bitrate. The first response also includes an indication of timing measurement support, which the reader device 210 requires knowledge of for subsequent commands.

A second command 503 comprises a Proximity Check (PC), which sends n challenge bytes RndC to the PICC 220. The PICC 220 sends a second response 504 with n bytes RndR in response. A similar third command 505 and corresponding third response 506 may be added to the sequence of command-response exchanges. In each of these command-response exchanges, the PCD 210 measures and stores the time for each PC execution. The PICC 220 also measures and locally stores the response time. Additional PC checks in the command-response exchange 505, 506 may be added to reduce the residual relay attack window. A typical maximum number of 8 such exchanges in total may be used in a practical implementation.

Following the PC check(s), a Get Proximity Check Time (GPCT) command-response exchange is performed, in which the PCD 210 sends a fourth command 507 requesting actual response times from the PICC 220. In response, the PICC 220 sends a fourth response 508 comprising an actual measured response time for the number of response times requested in the fourth command 507.

Finally, in a fifth command 509 the PCD initiates MAC verification with a Verify Proximity Check (VPC) command. The PICC responds with a fifth response 510, which the PCD then verifies. Provided the actual response times match, the PCD 210 then confirms the Proximity Check. If the actual response times do not match, the PCD 210 may abort any further command-response exchanges with the PICC 220 and/or may require a further Proximity Check to be performed.

The PCD 210 is able to detect in a secure way whether the PICC supports the GPCT process. The PCD 210 starts with a transaction towards the PICC 220, for example via a normal ISO/IEC 7816-4 ISO Select command. The PCD and PICC then establish a secure session via an application-specific mutual authentication. The PICC capabilities can be read out over the secure channel, before starting the actual Proximity Check protocol. The PICC capabilities indicate whether the device supports the Proximity Check protocol. The Proximity Check can then be executed using the secure channel session MAC key or a separate Proximity Check key.

The Proximity Check may be standardized via an addition to the ISO/IEC 14443-4 standard, allowing the application to perform the verification step with any application key. The Proximity Check may alternatively be standardized with ISO/IEC 7816-4 commands on APDU level.

From reading the present disclosure, other variations and modifications will be apparent to the skilled person. Such variations and modifications may involve equivalent and other features which are already known in the art of contactless communications systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

What is claimed is:

1. A method of performing a proximity check to determine whether a transponder device is in proximity of a reader device, the method comprising:

transmitting a command from the reader device to the transponder device, the command including a request for a plurality of measured response times for a number n of previous command-response exchanges stored in the transponder device;

in response to receiving the command at the transponder device, transmitting a response to the reader device, the response including the plurality of measured response times for the number n of previous command-response exchanges stored in the transponder device; and determining whether a predetermined criterion for the proximity check is fulfilled by comparing the plurality of measured response times stored in the reader device with the plurality of measured response times transmitted by the transponder device in the response.

2. The method of claim 1, wherein n is greater than 1.

3. The method of claim 2, wherein n is no greater than 8.

4. The method of claim 1, wherein the step of determining whether a predetermined criterion for the proximity check is fulfilled is performed by the reader device.

5. The method of claim 4, wherein the reader device aborts further command-response exchanges with the transponder device if the predetermined criterion for the proximity check is not fulfilled.

6. The method of claim 1, wherein the predetermined criterion comprises the plurality of measured response times stored by the reader device being equal to the plurality of measured response times transmitted by the transponder device in the response.

7. The method of claim 1 further comprising, prior to the step of transmitting the command from the reader device to the transponder device:

the reader device transmitting a previous command to the transponder device;

the transponder device transmitting a previous response to the reader device in response to the previous command; and the transponder device storing a measured response time for the previous response in a transponder memory.

8. The method of claim 7, wherein the previous command comprises a random number generated by the reader device.

9. The method of claim 8, wherein the previous command is repeated n times prior to the step of transmitting the command from the reader device to the transponder device.

10. A reader device configured for contactless communication with a transponder device, the reader device comprising:

an antenna;

a memory; and a processing unit, wherein the processing unit is configured to:

transmit a command to the transponder device, the command including a request for a plurality of measured response times for a number n of previous command-response exchanges stored in the transponder device;

in response to the command, receive from the transponder device, a response including the plurality of measured response times for the number n of previous command-response exchanges stored in the transponder device; and determine whether a predetermined criterion for the proximity check is fulfilled by comparing the plurality of measured response times stored in the reader device with the plurality of measured response times transmitted by the transponder device in the response.

11. The reader device of claim 10, wherein n is greater than 1.

12. The reader device of claim 11, wherein n is no greater than 8.

13. The reader device of claim 10, wherein the reader device is configured to abort further command-response exchanges with the transponder device if the predetermined criterion for the proximity check is not fulfilled.

14. The reader device of claim 10, wherein the predetermined criterion comprises the measured response time stored by the reader device being equal to the measured response time transmitted by the transponder device in the response.

15. A transponder device configured for contactless communication with a reader device, the transponder device comprising:

an antenna;

a transponder memory; and a processing unit, wherein the processing unit is adapted to:

measure and store in the transponder memory a measured response time during each command-response exchange of a plurality of command-response exchanges with the reader device;

receive a command from the reader device, the command including a request for a plurality of measured response times for a number n of previous command-response exchanges stored in the transponder memory; and in response to the command, send a response including the plurality of stored measured response times for the previous n command-response exchanges.

16. The transponder device of claim 15, wherein n is greater than 1.

17. The transponder device of claim 16, wherein n is no greater than 8.

18. A method performed by a transponder device and a reader device, the method comprising:

conducting a number n of command-response exchanges between the reader device and the transponder device;

in conjunction with conducting the number n of the command response exchanges, storing, within the transponder device, a plurality of measured response times; and after conducting the number n of command-response exchanges, performing a proximity check to determine whether the transponder device is in proximity of the reader device by transmitting a command from the reader device to the transponder device, the command including a request for the plurality of measured response times stored within the transponder device, in response to receiving the command at the transponder device, the transponder device transmitting a response to the reader device, the response including the plurality of measured response times stored within the transponder device, and determining whether a predetermined criterion for the proximity check is fulfilled by comparing a corresponding plurality of measured response times stored within a memory accessible to the reader device with the plurality of measured response times transmitted by the transponder device in the response.

* * * * *